INVENTOR.
IVAN CERESNA
BY Hudson & Young
ATTORNEYS

April 21, 1959  I. CERESNA  2,883,274
PELLETING OF CARBON BLACK
Filed Oct. 12, 1956  3 Sheets-Sheet 2

INVENTOR.
IVAN CERESNA
BY Hudson & Young
ATTORNEYS

April 21, 1959  I. CERESNA  2,883,274
PELLETING OF CARBON BLACK
Filed Oct. 12, 1956  3 Sheets-Sheet 3
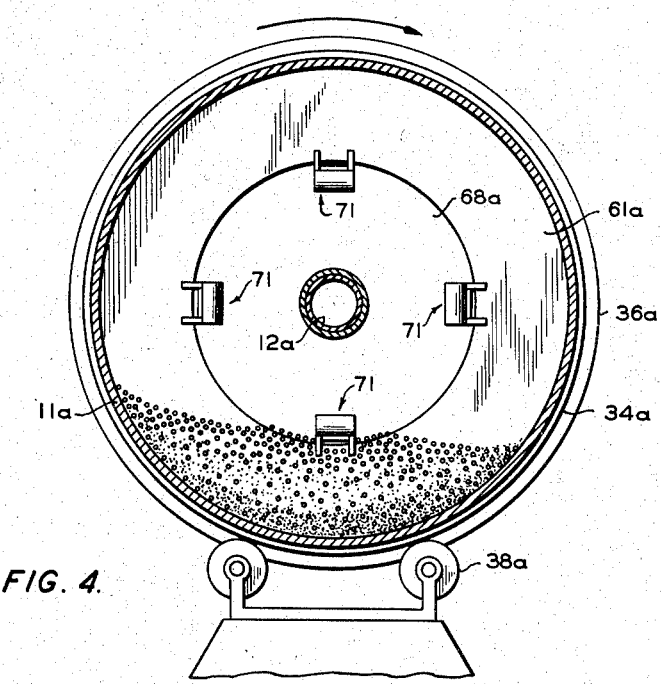
FIG. 4.
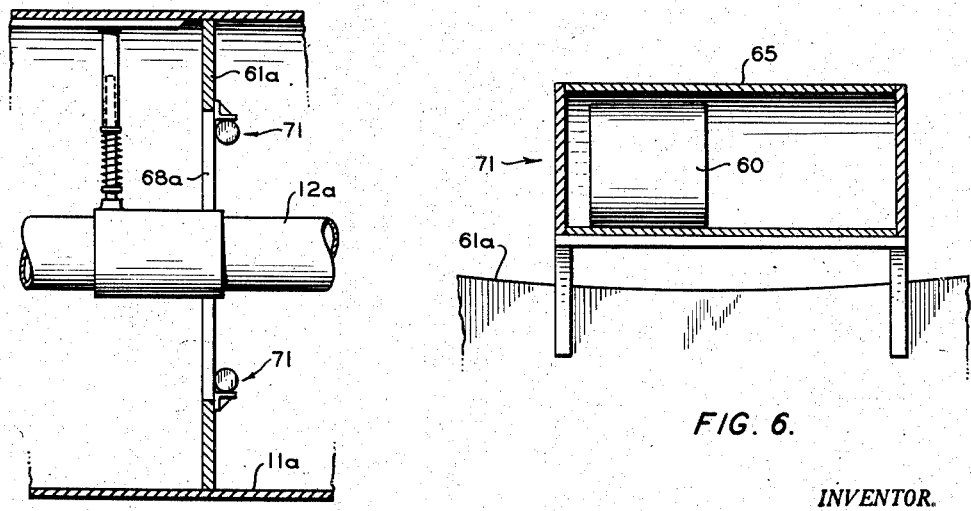
FIG. 5.
FIG. 6.
INVENTOR.
IVAN CERESNA
BY Hudson & Young
ATTORNEYS

United States Patent Office 2,883,274
Patented Apr. 21, 1959

2,883,274

PELLETING OF CARBON BLACK

Ivan Ceresna, Borger, Tex., assignor to Phillips Petroleum Company, a corporation of Delaware Application October 12, 1956, Serial No. 615,600

7 Claims. (Cl. 23—314)

This invention relates to the pelleting of carbon black. In one of its more specific aspects, it relates to a method and an apparatus for conversion of light, flocculent carbon black as produced into free-flowing, relatively dustless, small aggregates or pellets.

The carbon black industry has for many years produced carbon black by the incomplete combustion of a hydrocarbon such as natural gas, gas oils, viscous asphaltic crude oils, and the like. The carbon black, as initially produced, is extremely light, finely divided material. This loose black is conventionally introduced directly into an horizontally rotating cylindrical drum or pellet mill. The pellet mill is rotated and the loose black is converted into pellets by rolling the same in a manner similar to the technique utilized in a tumbling drum. In rolling the particles of loose black, nuclei are formed and these gather particles of black until small, generally spherical pellets have been formed. The loose black is introduced at one end of the pellet mill and the pellets progress through the mill and through outlet openings at the other end of the mill.

The pellet mills generally used in the industry at the present time operate satisfactorily. However, the optimum capacities of the pellet mills are somewhat limited to a certain bed depth and mill speed. The capacity can be increased somewhat by increasing the bed depth and mill speed up to a certain point, beyond which the contents in the mill goes to loose black necessitating the unloading of the mill and beginning the conversion process again with a new supply of loose black. Even though the bed depth and mill speed are kept at optimum, surges of loose black supply and other undesirable operating conditions frequently lower the density of the pellet product due to the presence of loose black or fines.

Accordingly, an object of this invention is to provide an improved method and apparatus for the pelleting of carbon black. Another object is to provide an improved pellet mill having a desirable throughput capacity. A further object is to provide an improved pellet mill whereby a pellet product having desirable density is produced. A further object is to provide an improved pellet mill for pelleting loose carbon black, which mill can be operated with a minimum of surveillance. Further objects and advantages of my invention will become apparent, to those skilled in the art, from the following discussion, appended claims, and accompanying drawings in which:

Figure 4 is a cross-sectional view of a pellet mill similar to that of Figure 1 illustrating a further embodiment of my invention; and Figures 5 and 6 are enlarged views illustrating certain parts of Figure 4.

Figure 1:
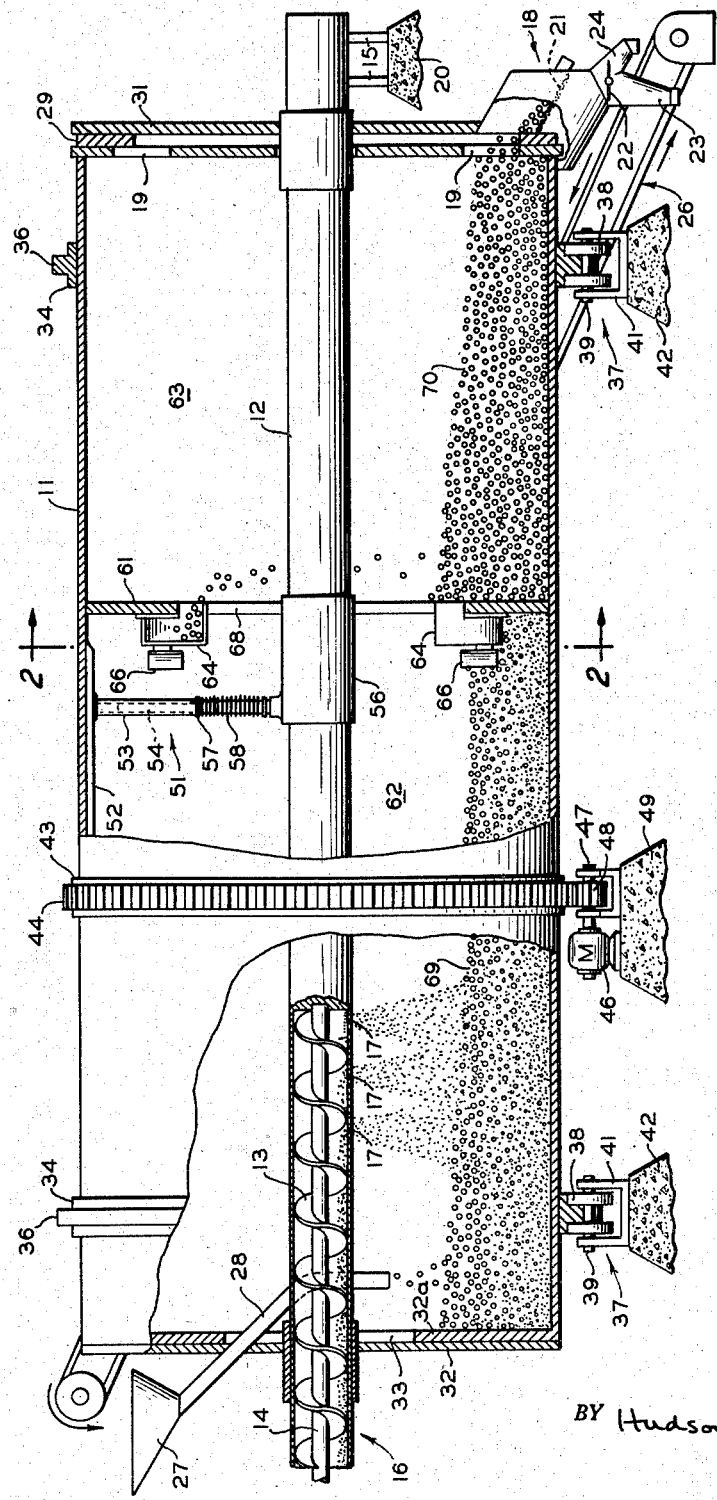
Figure 1 is a diagrammatic representation of a pellet mill, partly in longitudinal section and partly in elevational section illustrating one embodiment of my invention.

Broadly contemplated, my improved pelleting mill for pelleting loose carbon black comprises an elongated, hollow cylindrical drum disposed horizontally and having a horizontally disposed conveyor extending from the inlet end of said drum for introducing loose carbon black into the mill. An annular weir is mounted intermediate the two ends of the drum, dividing the same into a pelleting compartment and a densifying compartment. Means are provided for rotating the drum, and the annular weir therewith, along with means for removing the pelleted carbon black product from the outlet end of the drum.

Referring to the drawings now, and to Figure 1 in particular, numeral 11 refers to an elongated, hollow cylindrical drum hereinafter referred to as the pellet mill. Suspended longitudinally in this hollow cylinder and extending beyond either end is a pipe or tube 12. The upstream portion of this tube carries a helical conveyor screw 13, the shaft 14 of which extends on through the ends of the mill for driving or power purposes; that end of the tube 12 extending through the discharge end of the mill being supported by supports 15 and concrete pier 20. Members 12, 13 and 14 comprise a conveyor generally designated 16, which serves to convey the raw, loose carbon black froma storage or from other sources (not shown) to the pellet mill. The conveyor tube 12 contains several spaced openings 17 for introduction and distribution of raw carbon black in the pellet mill. Member 18 is a hopper-like proportioning or dividing member. Openings 19 permit outflow of carbon black pellets into this dividing member 18. A large mesh hardware cloth 21 serves to remove "coarse scale" and foreign objects which might inadvertently be present in the discharging pelleted black. A damper-like member or other type proportioning mechanism 22 serves to divide the stream of pellets into two parts, one portion flowing through the tube 23 as product, the other flowing through a tube 24 is discharged on a conveyor, such as belt conveyor 26. The conveyor elevates and transports the recycle pellets and finally discharges them into a hopper 27 from which they flow by gravity through a tube 28 into the charge end of the pellet mill. Alternatively, other means for promoting the initial formation of pellets can be employed in place of the recycled pellets, or, as with some types of carbon black, e.g., channel black, such means (including pellet recycle) can be dispensed with.

Some steel bands 34 are placed tightly around the outer drum 11 in the approximate positions indicated on the drawing and around these bands 34 are placed heavy steel rings 36. These rings act as tires for supporting the drum assembly. In supporting the drum assembly, each ring 36 rests on a pair of roll support assemblies 37. These latter assemblies are composed of small diameter rollers 38 mounted on shafts 39, the ends of which are supported in bearings 41 and the bearings in turn are supported by concrete bases or piers 42.

A steel band 43 is placed around the outer drum about the center longitudinally and around this band 43 is a gear wheel 44 very tightly attached thereto. A source of motive power 46 drives a shaft 47 to turn a gear wheel 48 which meshes with the teeth of the large wheel 44 for rotation of the pellet mill. The motive power source 46 and the gear wheel 48 can be mounted on a concrete pier 49.

The mill may be rotated by the gear system dscribed or it may be rotated by a wheel system consisting of inflated synthetic tires on wheels similar to those used on automobiles. The gear wheel 44 may be positioned at either end of the pellet mill if desired, but it is preferable to position this driven gear 44 at about the center of the length of the mill.

Within the pellet mill is positioned a scraper assembly generally designated 51 which is intended to remove any carbon black which tends to adhere to the surface of the drum 11. Although only one scraper assembly is shown in the drawing, I prefer to use several of these scraper assemblies in an elongated pellet mill. The scraper assembly 51 is composed of a scraper member 52 which is welded to a sleeve 53. The sleeve 53 is intended to accommodate one end of an arm 54, the other end of which is welded to a pipe 56 surrounding the conveyor pipe 12. A push plate 57 is welded to the end of the sleeve 53. A compression spring 58 is placed between the push plate 57 and the lower end of the arm 54. This spring 58 is intended to push the scraper member 52 toward the inner wall of the drum 11 thereby scraping loose any adhering carbon black as the drum rotates.

Figure 3:
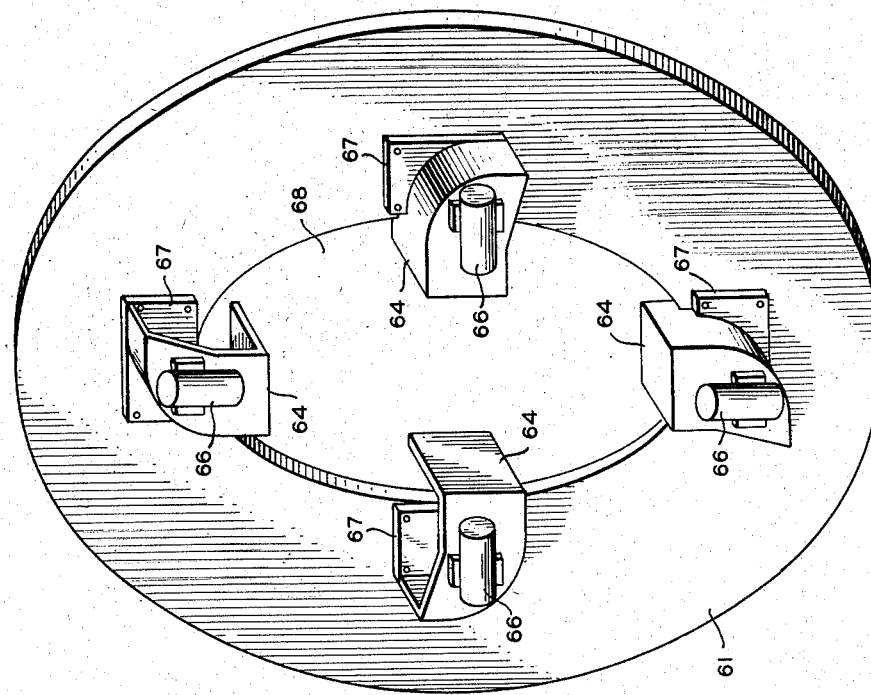
Figure 3 is an isometric view of the annular weir illustrated in Figures 1 and 2.

The pelleting apparatus described up to this point is conventional, such as shown in the U.S. Patent 2,503,361. In accordance with my invention, I provide a pellet mill such as that shown in Figure 1 with an annular weir or dam 61 mounted within the drum 11 at its periphery so as to divide the mill into a pelleting compartment 62 and a densifying compartment 63. Suitably mounted on the inlet face of the annular weir 61 is a plurality of scoops or dippers generally designated 64. Mechanical rappers 66 are in turn mounted on one side of the scoop 64. The annular weir 61, scoops 64 and rappers 66 are shown in detail in Figures 2 and 3. The scoops 64 are preferably mounted on suitable base plates 67 which in turn are riveted or otherwise secured to the inlet face of the annular weir adjacent the opening 68. The annular weir 61 is mounted within the mill normal to the horizontal axis of the latter. Through the opening 68 of the annular weir 61 passes the conveyor tube 12. The rappers 66, as clearly seen in Figure 6, are composed of a hollow sleeve 65, closed at both ends, in which is placed a movable member 60 which is adapted to contact the inner wall of the sleeve 65 so as to produce a jarring or knocking effect upon rotation of the scoops 64 with the annular weir 61. In this manner, any carbon black adhering to the annular weir 61 or to the scoops 64 will be jarred loose during rotation of the mill. Although the annular weir in these drawings is shown provided with four scoops 64, it is within the scope of my invention to only employ one scoop, or, as will be described hereinbelow, merely provide an annular weir without any scoops.

The scoops 64 are merely preferred means for transferring carbon black aggregates or pellets from the top of the bed 69 in the pelleting compartment 62 into the densifying compartment 63. As shown clearly in Figure 3, the scoops 64 have an open side in the direction of rotation and a closed top side which extends axially back a small distance into the densifying compartment through the opening 68 in the annular weir 61.

Alternatively, as shown in that embodiment of my invention illustrated in Figures 4 and 5, an annular weir 61a can be employed without providing scoops thereon. In this embodiment, mechanical rappers 71 are suitably mounted on the discharge face of the annular weir 61a adjacent the opening 68a. Where an annular weir 61a is employed in a pellet mill, it is necessary to carry the bed in the pelleting compartment at a sufficient height so as to enable the pellets on top of the bed in this compartment to pass over the annular weir 61a through the opening 68a into the densifying compartment.

Although I prefer to use some type of mechanical rapper, such as that illustrated in the drawings, it is to be understood that satisfactory results have been achieved according to the practice of my invention without employing any rappers.

Figure 2:
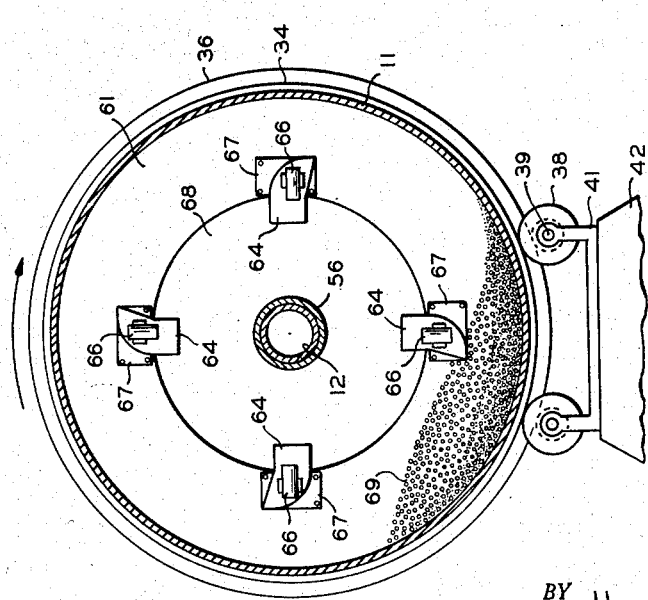
Figure 2 is a cross-sectional view of the pellet mill of Figure 1 taken along the line 2—2.

In the operation of my pellet mill shown in Figures 1 and 2, raw, undensified carbon black is fed by the conveyor 16 or other suitable conveying means through the feed openings 17 in the bottom side of the conveyor tube 12. In a mill 8 feet in diameter by 48 feet in length, the depth of the bed in the pelleting compartment can vary, for example, between 11 and 24 inches, depending upon the size of the annular weir 61 and the opening 68, as well as the size of the end plate 32a. As the mill revolves about its longitudinal axis the newly added black adheres to the surface of the pellets in the feed end of the mill. Sufficient pelleted product is recycled to the mill via conveyor belt 26, hopper 27 and tube 28 so as to provide nuclei for pellet growth. Since the pellets as formed are larger in size than the loose carbon black they roll on the top of the bed 69 during mill rotation. Formed pellets are picked up by the scoops 64 from the top of the bed 69 and transferred through the opening 68 in the weir 61 to the densifying compartment 63 where through further work of rotation the pellets acquire a higher density. The loose black remains in the pelleting compartment 62 at all times during normal operation of the mill, thus there is more space given to the pellets for densification in the densifying compartment. Only high density pellets are transferred for recycle via conveyor belt 26 and the pelleting operation can be started up with high quality pellets.

In the operation of a pellet mill such as that illustrated in Figure 4, the operation is similar to that hereinabove described except that the depth of the bed in the pelleting compartment of the mill is carried at a sufficient height so as to enable the pellets rolling on top of the bed to roll through the opening 68a of the annular weir 61a into the densifying compartment. Since it is desirable in many instances to avoid as much mechanical working of the pellets as possible, the use of an annular weir without employing scoops is preferred to transfer the pellets from the pelleting compartment into the densifying compartment.

EXAMPLE I

A high modulus furnace carbon black was produced by the incomplete combustion of a sulfur dioxide-extracted cracked recycle gas oil type hydrocarbon fraction. The loose black was fed to a 8′ x 48′ mill which was rotated at about 15.8 r.p.m. and operated with a pellet recycle ratio of about 2. The mill was of commercial size and was provided with an annular weir with one scoop mounted thereon according to the practice of my invention. Twenty-four samples of pelleted product were collected during a period of three days' operation. A similar number of samples were collected before modifying a conventional mill according to the practice of my invention for purposes of comparison. The average density of the pelleted product and the capacity of this latter mill are also set forth in Table I.

Table I

| | Applicant's Pellet Mill | Conventional Pellet Mill |
| --- | --- | --- |
| Mill size (ft.) | 8 x 48 | 8 x 48 |
| R.p.m. of mill | 15.8 | 15.8 |
| Recycle to feed ratio | 2 | 2 |
| Charge end bed depth [1] (in.) | 16.5 | |
| Discharge end bed depth (in.) | 18 | |
| Average daily production (lb.) | 25,137 | 22,250 |
| Average density of pellet product (lb./cu. ft.) | 24.0 | 23.8 |

[1] See footnote, table II.

The advantage of the increase in density of the pellets and the increased capacity of the applicant's mill when considered from the point of view of a freight car load is thus readily apparent from the above data. The pelleted product produced by the applicant's mill described above is much denser and more resistant to breakage in handling and shipping than are the pellets having a density of 23.8 lbs. per cu. ft. produced by the same mill prior to its modification according to my invention.

EXAMPLE II

A high modulus furnace carbon black was produced by the incomplete combustion of a sulfur dioxide-extracted cracked recycle gas oil type hydrocarbon fraction. The loose black was similarly fed to a 8' x 48' mill modified according to the practice of my invention, employing an annular weir without scoops. The mill was rotated at 15.8 r.p.m. and operated with pellet recycle ratio of about 2. Samples of the pelleted product were collected during a period of three days' operation and the average density and the average capacity of the mill are tabulated in Table II. For purposes of comparison, the density of a pelleted product and the capacity of the same mill before modifying the mill according to the practice of my invention are also set forth in Table II.

Table II

|  | Applicant's Pellet Mill | Conventional Pellet Mill |
| --- | --- | --- |
| Mill size (ft.) | 8 x 48 | 8 x 48 |
| R.p.m. of mill | 15.8 | 15.8 |
| Recycle to feed ratio | 2 | 2 |
| Charge end bed depth [1] (in.) | 19 |  |
| Discharge end bed depth (in.) | 18 |  |
| Average daily production (lb.) | 25,400 | 22,250 |
| Average density of pellet product (lb./cu. ft.) | 24.1 | 23.8 |

[1] Bed depth reported at depth of weir.

The advantage of the increase in the average density of the pelleted product and the capacity of the applicant's mill is readily seen from the above data.

Various modifications and alterations of my invention will become apparent, to those skilled in the art, from the foregoing description and accompanying drawings. It is understood that although preferred embodiments of my invention are set forth and described, my invention is not to be unduly limited thereto.

I claim:

1. An apparatus for pelleting carbon black comprising a horizontally disposed, elongated, hollow, cylindrical drum, an annular weir within said drum dividing the same into a pelleting compartment and a densifying compartment, the periphery of said weir rigidly secured to the inner wall of said drum intermediate the ends thereof and normal to the horizontal axis of said drum, means for transferring initially formed pellets from said pelleting compartment across said weir into said densifying compartment, said last-mentioned means comprising at least one scoop mounted on that side of said weir which defines in part said pelleting compartment, said scoop having an opening in the direction of the rotation of said drum and an opening in communication with said densifying compartment, a horizontally disposed open end screw conveyor extending through the end walls of said drum, said conveyor having openings in that portion extending through said pelleting compartment for introducing flocculent carbon black at a plurality of points therein, means for rotating said drum, means for removing carbon black pellets from the discharge end of said densifying compartment, and means for recycling a portion of said carbon black pellets to said pelleting compartment.

2. In the art of pelleting flocculent carbon black in a rotatable cylinder mill, the steps which comprises continuously elevating by rotation one side of an elongated first bed of carbon black pellets and flocculent carbon black in a pelleting zone to effect a transverse downward rolling and tumbling movement of the elevated particles over said first bed, continuously picking up carbon black pellets from the top of one end of said first bed and elevating them to a sufficient height in such a manner as to cause them to fall and be transferred to one end of a second bed of carbon black pellets in a densifying zone, rotating said mill in such a manner and introducing said flocculent carbon black into said mill at such a rate such that the depth of said one end of said first bed is lesser than the depth of said one end of said second bed, said second bed being continuously elevated by rotation in a manner similar to said first bed, and withdrawing carbon black pellets from one end of said densifying zone.

3. In the art of pelleting flocculent carbon black in a rotatable cylindrical mill, the steps which comprise continuously elevating by rotation one side of an elongated first bed of carbon black pellets and flocculent carbon black in a pelleting zone to effect a transverse downward rolling and tumbling movement of the elevated particles over said first bed, the amount and distribution of said carbon black pellets and said flocculent carbon black in said pelleting zone being so controlled as to permit the continuous transfer of carbon black pellets from the top of one end of said first bed to one end of a second bed of carbon black pellets in a densifying zone, said transfer being effected by picking up said carbon black pellets from said one end of said first bed and elevating them to a sufficient height in such a manner as to cause them to fall and be transferred to said one end of said second bed, rotating said mill in such a manner and introducing said flocculent carbon black into said mill at such a rate that the depth of said one end of said first bed is lesser than the depth of said one end of said second bed, withdrawing carbon black pellets from one end of said densifying zone, dividing the withdrawn carbon black pellets into a recycle portion and a product portion, adding said recycle portion at the other end of said first bed, and adding flocculent carbon black at a region of said first bed intermediate the ends thereof.

4. An apparatus for pelleting carbon black comprising a horizontally disposed, elongated, hollow, cylindrical drum, an annular imperforate weir within said drum dividing the same into a pelleting compartment and a densifying compartment, said weir having a central opening, the periphery of said weir rigidly secured to the inner wall of said drum intermediate the ends thereof and normal to the horizontal axis of said drum, transfer means secured to said weir for transferring initially formed pellets from said pelleting compartment across said weir through its central opening into said densifying compartment, a horizontally disposed conveyor extending a substantial distance through the inlet end of said drum into said pelleting compartment for introducing flocculent carbon black at a plurality of point therein, means for rotating said drum, and means for removing carbon black pellets from the discharge end of said densifying compartment.

5. Apparatus according to claim 4 further comprising at least one mechanical rapper mounted on said weir to loosen adhering carbon black therefrom.

6. In the art of pelleting a finely divided solid in a rotating cylindrical mill, the steps which comprise rotating said mill in such a manner as to cause said finely divided solids to agglomerate into partially formed pellets in a first bed, picking up said pellets from the top of one end of said first bed and elevating them to a sufficient height in such a manner as to cause them to fall and be transferred to one end of a second bed in said mill where said partially formed pellets are densified, rotating said mill in such a manner and introducing said finely divided solids into said mill at such a rate such that the depth of said one end of said first bed is lesser than the depth of said one end of said second bed, and withdrawing densified pellets from the other end of said second bed.

7. An apparatus for pelleting carbon black comprising a horizontally disposed, elongated, hollow, cylindrical drum, an annular weir within said drum dividing the same into a pelleting compartment and a densifying compartment, the periphery of said weir rigidly secured to the inner wall of said drum intermediate the ends thereof and normal to the horizontal axis of said drum, at least one scoop mounted on that side of said weir which defines in part said pelleting compartment, said scoop having an opening in the direction of the rotation of said drum and an opening in communication with said densifying compartment, a horizontally disposed conveyor extending a substantial distance through the inlet end of said drum into said pelleting compartment for introducing flocculent carbon black at a plurality of points thereing, means for rotating said drum, and means for removing carbon black pellets from the discharge end of said densifying compartment.

References Cited in the file of this patent

UNITED STATES PATENTS

| | | |
|---|---|---|
| 2,127,137 | Price | Aug. 16, 1938 |
| 2,164,164 | Price | June 27, 1939 |
| 2,503,361 | Studebaker | Apr. 11, 1950 |
| 2,543,898 | De Vaney | Mar. 6, 1951 |
| 2,638,625 | Studebaker et al. | May 19, 1953 |
| 2,656,257 | Hohnadel | Oct. 20, 1953 |
| 2,674,522 | Takewell et al. | Apr. 6, 1954 |

FOREIGN PATENTS

| | | |
|---|---|---|
| 1,033,727 | France | Apr. 8, 1953 |